US010870776B2

(12) United States Patent
Yang et al.

(10) Patent No.: US 10,870,776 B2
(45) Date of Patent: Dec. 22, 2020

(54) CURABLE AQUEOUS COMPOSITION

(71) Applicant: Rohm and Haas Company, Collegeville, PA (US)

(72) Inventors: Miao Yang, Shanghai (CN); Zhaohui Qu, Shanghai (CN); Yin Xue, Shanghai (CN)

(73) Assignee: Rohm and Haas Company, Collegeville, PA (US)

( * ) Notice: Subject to any disclaimer, the term of this patent is extended or adjusted under 35 U.S.C. 154(b) by 124 days.

(21) Appl. No.: 15/574,906

(22) PCT Filed: May 19, 2015

(86) PCT No.: PCT/CN2015/079255
§ 371 (c)(1),
(2) Date: Nov. 17, 2017

(87) PCT Pub. No.: WO2016/183792
PCT Pub. Date: Nov. 24, 2016

(65) Prior Publication Data
US 2018/0163079 A1  Jun. 14, 2018

(51) Int. Cl.
| | |
|---|---|
| *C09D 7/65* | (2018.01) |
| *C09D 133/04* | (2006.01) |
| *C09D 135/00* | (2006.01) |
| *C09D 135/02* | (2006.01) |
| *C08L 35/02* | (2006.01) |
| *C08L 71/02* | (2006.01) |
| *C08F 220/18* | (2006.01) |
| *C08K 5/00* | (2006.01) |
| *C08K 5/1515* | (2006.01) |

(52) U.S. Cl.
CPC .......... *C09D 135/02* (2013.01); *C08F 220/18* (2013.01); *C08K 5/0025* (2013.01); *C08K 5/1515* (2013.01); *C08L 35/02* (2013.01); *C08L 71/02* (2013.01); *C09D 7/65* (2018.01); *C09D 133/04* (2013.01); *C09D 135/00* (2013.01)

(58) Field of Classification Search
None
See application file for complete search history.

(56) References Cited

U.S. PATENT DOCUMENTS

| | | | |
|---|---|---|---|
| 4,172,177 A | 10/1979 | Sato | |
| 4,325,856 A | 4/1982 | Ishikawa et al. | |
| 4,384,056 A | 5/1983 | Schmidt et al. | |
| 4,539,361 A | 9/1985 | Siol et al. | |
| 4,654,397 A | 3/1987 | Mueller-Mall et al. | |
| 4,814,373 A | 3/1989 | Frankel et al. | |
| 5,314,943 A | 5/1994 | Steinwand | |
| 5,367,004 A * | 11/1994 | Barsotti | B05D 7/53 523/414 |
| 5,376,704 A * | 12/1994 | Barsotti | B05D 7/53 523/414 |
| 5,780,117 A * | 7/1998 | Swartz | C08G 59/18 427/493 |
| 6,057,400 A * | 5/2000 | Kinney | C08G 18/0823 427/258 |
| 6,384,131 B1 * | 5/2002 | Kinney | C08G 18/0823 427/258 |
| 8,658,742 B2 | 2/2014 | Dombrowski et al. | |
| 8,911,874 B2 | 12/2014 | O'Brien et al. | |
| 2006/0127674 A1 | 6/2006 | Blankenship et al. | |
| 2008/0045659 A1 | 2/2008 | Hakuya et al. | |

FOREIGN PATENT DOCUMENTS

| | | |
|---|---|---|
| CN | 155472 | 12/2004 |
| GB | 124846 A | 4/1919 |
| JP | 7228825 | 8/1995 |
| JP | 8048914 | 2/1996 |
| JP | 11315250 | 11/1999 |

OTHER PUBLICATIONS

Lee, H. and Neville, K., Handbook of Epoxy Resins, McGraw-Hill Book Company, New York, 1967, Chapter 2, pp. 2-1 to 2-27.
PCT/CN2015/079255, International Search Report and Written Opinion dated Feb. 25, 2016.
PCT/CN2015/079255, International Preliminary Report on Patentability dated Nov. 21, 2017.

* cited by examiner

Primary Examiner — Sheeba Ahmed

(57) ABSTRACT

The present invention provides a curable aqueous composition comprising a (co)polymer and an epoxy crosslinker. The (co)polymer comprises, as (co)polymerized units, from 0.05% to 10% by dry weight, based on total monomers of the (co)polymer, ethylenically unsaturated acidic monomers having at least two carboxylic acid groups, and the epoxy crosslinker is an aliphatic compound having at least two reactive oxirane groups. It further provides a method for forming a treated substrate and a substrate formed by the method.

13 Claims, No Drawings

CURABLE AQUEOUS COMPOSITION

FIELD OF THE INVENTION

The present invention relates to a curable aqueous composition, a method for forming a treated flexible substrate using the curable aqueous composition, and the substrate so treated.

INTRODUCTION

Flexible substrates such as paper, woven fabrics and nonwoven fabrics are frequently consolidated or strengthened by treating with a polymeric binder to dispose in or on the substrates. Such polymeric binder could be known as a curable aqueous composition in the art. The tensile strength of treated substrates in the state of dry, water immersed (wet) or isopropyl alcohol immersed (IPA) is one of the most important properties that reflect the quality of the curable aqueous composition. When a curable aqueous composition-treated substrate has high dry, wet or IPA tensile strength, it usually has improved properties including resiliency, crack resistance, dry-clean resistance, wash durability, tear strength and fold endurance.

In many instances, the curable aqueous composition is present in a substantially thermoplastic or substantially uncrosslinked state so that flow, penetration, film formation and the like may occur after the curable aqueous solution or dispersion has contacted the substrate. In order to enhance the properties of the treated substrate, it is frequently desirable to effect crosslinking once the curable aqueous composition has reached its final location, or concurrently with the drying process. Many of the conventional crosslinking agents such as copolymerized N-methylol acrylamide (NMA) and added urea/formaldehyde resins inherently contain or release formaldehyde. Additionally, a NMA-containing curable aqueous composition releases even more formaldehyde upon heating.

It is therefore desired to provide an environment-friendly curable aqueous composition with good tensile strength.

SUMMARY OF THE INVENTION

The present invention provides a curable aqueous composition comprising a (co)polymer and an epoxy crosslinker. The (co)polymer comprises, as (co)polymerized units, from 0.05% to 10% by dry weight, based on total monomers of the (co)polymer, ethylenically unsaturated acidic monomers having at least two carboxylic acid groups. The epoxy crosslinker is an aliphatic compound having at least two reactive oxirane groups.

The present invention further provides a method for forming a treated substrate comprising the steps of: i) forming a curable aqueous composition comprising a (co)polymer and an epoxy crosslinker, said (co)polymer comprises, as (co)polymerized units, from 0.05% to 10% by dry weight, based on total monomers of the (co)polymer, ethylenically unsaturated acidic monomers having at least two carboxylic acid groups, and said epoxy crosslinker is an aliphatic compound having at least two reactive oxirane groups; ii) contacting a flexible substrate with the curable aqueous composition; and iii) heating the curable aqueous composition at a temperature of from 80° C. to 250° C. The present invention further provides a substrate formed by the above method.

DETAILED DESCRIPTION OF THE INVENTION

For the purpose of describing the components in the compositions of this invention, all phrases comprising parenthesis denote either or both of the included parenthetical matter and its absence. For example, the phrase "(co)polymer" includes polymer, copolymer and mixtures thereof; and the phrase "(meth)acrylate" means acrylate, methacrylate, and mixtures thereof.

The curable aqueous composition comprises a (co)polymer and an epoxy crosslinker.

The (Co)Polymer

The curable aqueous composition of the present invention comprises a (co)polymer or a cold blend of (co)polymer. The phrase "curable" herein is meant capable of a structural or morphological change which is sufficient to alter the properties of a flexible substrate to which an effective amount of polymeric binder has been applied such as, covalent chemical reaction, ionic interaction or clustering, improved adhesion to the substrate, phase transformation or inversion, and hydrogen bonding. The (co)polymer herein is a (co)polymer prepared by the addition polymerization of ethylenically-unsaturated monomers in an aqueous emulsion or solution polymerization process; the cold blend of (co)polymer herein is the mixture of two or more emulsion or solution (co)polymer. By "aqueous composition" herein is meant a composition in which the continuous phase is water or a mixture including predominantly water but also including water-miscible solvent. A "curable composition" herein is one that undergoes a chemical process to some extent such as covalent bond formation under the agency of added energy, most typically heating.

The (co)polymer comprises, as (co)polymerized units, from 0.05% to 10%, preferably from 2% to 8%, and more preferably from 4% to 6% by dry weight, based on total monomers of the (co)polymer, ethylenically unsaturated acidic monomers having at least two carboxylic acid groups. Suitable examples of the ethylenically unsaturated acidic monomers having at least two carboxylic acid groups include itaconic acid, fumaric acid, maleic acid, aconitic acid, their salts, and mixtures thereof. Preferably, the ethylenically unsaturated acidic monomers have two carboxylic acid groups.

The (co)polymer further comprises, up to 99.95%, preferably from 75% to 98%, and more preferably from 90% to 95% by dry weight, based on total monomers of the (co)polymer, one or more other (co)polymerized ethylenically unsaturated monomer(s). Suitable examples of the other (co)polymerized ethylenically unsaturated monomer(s) include (meth)acrylic ester monomer including methyl (meth)acrylate, ethyl (meth)acrylate, butyl(meth)acrylate, 2-ethylhexyl(meth)acrylate, decyl(meth)acrylate, hydroxyethyl(meth)acrylate, hydroxypropyl(meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, and N-vinyl pyrollidone; and (meth)acrylonitrile. Preferably, monomers which may generate formaldehyde on polymerization or during subsequent processing such as N-alkylol(meth)acrylamide are excluded.

In some embodiments, the (co)polymer further comprises less than 5%, preferably less than 2%, and more preferably less than 1% by dry weight, based on total monomers of the (co)polymer, a (co)polymerized multi-ethylenically unsaturated monomer. The multi-ethylenically unsaturated monomer includes allyl(meth)acrylate, diallyl phthalate, 1,4-butylene glycol di(meth)acrylate, 1,3-butylene glycol di(meth)acrylate, 1,2-ethylene glycol di(meth)acrylate, 1,6-hexanediol di(meth)acrylate and divinyl benzene.

The curable aqueous composition may comprise at least two different (co)polymers. For a mixture of two or more emulsion or solution polymers, the content of the (co) polymerized ethylenically unsaturated acidic monomers having at least two carboxylic acid groups shall be determined from the overall composition of the (co)polymers without regard for the number of (co)polymers therein.

The emulsion or solution polymerization techniques used to prepare the aqueous emulsion or solution (co)polymer are well known in the art, and are disclosed in at least U.S. Pat. Nos. 4,325,856; 4,654,397; 5,314,943; and 4,814,373. Conventional surfactants may be used as anionic and/or nonionic emulsifiers such as alkali metal or ammonium alkyl sulfates, alkyl sulfonic acids, fatty acids, and oxyethylated alkyl phenols. The amount of surfactant used is usually 0.1% to 6% by dry weight, based on the dry weight of total monomers. Either thermal or redox initiation processes may be used. Conventional free radical initiators may be used and suitable examples include hydrogen peroxide, t-butyl hydroperoxide, t-amyl hydroperoxide, ammonium, and alkali persulfates, typically at a level of 0.01% to 3.0% by dry weight, based on the dry weight of total monomers. Redox systems using the same initiators coupled with a suitable reductant such as sodium hydrosulfite, isoascorbic acid, and sodium bisulfite may be used at similar levels, optionally in combination with metal ions such as iron and copper, optionally further including complexing agents for the metal. Chain transfer agents such as mercaptans may be used to adjust the molecular weight of the (co)polymers. The monomer mixture may be added neat or as an emulsion in water. The monomer mixture may be added in a single addition or in multiple additions or continuously over the reaction period using a uniform or varying composition. Additional ingredients such as free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361 may be employed.

In another embodiment, the aqueous emulsion (co)polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as core/shell or core/sheath particles, core/shell particles with shell phases incompletely encapsulating the core, core/shell particles with a multiplicity of cores, and interpenetrating network particles. Each of the stages of the multi-staged emulsion polymer may contain monomers, surfactants, and chain transfer agents selected from those disclosed herein-above for the emulsion polymer.

For a multi-staged emulsion polymer, the copolymerized dicarboxylic acid monomer content shall be determined from the overall composition of the emulsion polymer without regard for the number of stages or phases therein. The polymerization techniques used to prepare such multi-stage emulsion polymers are well known in the art and are disclosed in U.S. Pat. Nos. 4,325,856; 4,654,397; and 4,814,373.

The glass transition temperature (Tg) of the (co)polymer is from −65° C. to 150° C., preferably from −55° C. to 65° C., and more preferably from −35° C. to 40° C. Tgs of the polymers herein are calculated using the Fox equation (T. G. Fox, Bull. Am. Physics Soc., Volume 1, Issue No. 3, page 123 (1956)), that is, for calculating the Tg of a copolymer of monomers M1 and M2, $$1/Tg(\text{calc.})=w(M1)/Tg(M1)+w(M2)/Tg(M2),$$

wherein Tg(calc.) is the glass transition temperature calculated for the copolymer, w(M1) is the weight fraction of monomer M1 in the copolymer, w(M2) is the weight fraction of monomer M2 in the copolymer, Tg(M1) is the glass transition temperature of the homopolymer of M1, and Tg(M2) is the glass transition temperature of the homopolymer of M2, and all temperatures being in Kelvin (K), which can be transferred to degree Celsius (° C.) by the equation of T(° C.)=T(K)−273.15.

The glass transition temperatures of the homopolymers may be found, for example, in "Polymer Handbook", edited by J. Brandrup and E. H. Immergut, Interscience Publishers. The average particle diameter of the (co)polymer particles is typically from 30 nanometers to 500 nanometers, preferably from 60 nanometers to 150 nanometers as measured by a Brookhaven Model BI-90 Particle Sizer supplied by Brookhaven Instrument Corporation.

The Epoxy Crosslinker

The epoxy crosslinker is an aliphatic compound having at least two reactive oxirane groups. Suitable examples of the epoxy crosslinker include glycidyl ether which is the reaction product of epichlorohydrin and aliphatic polyols, and glycidyl ester which is the reaction product of epichlorohydrin and aliphatic dicarboxylic acids. Suitable examples of the aliphatic polyols include monomeric polyols and polymeric polyols. Suitable example of monomeric polyols include ethylene glycol, glycerin, 1,4-butanediol, 1,6-hexanediol, pentaerythritol and mixtures thereof. Suitable examples of polymeric polyols include polyglycols such as polyethylene glycol (PEG), polypropylene glycol (PPG), polybutylene glycol (PBG), polyglycol copolymers, and the mixture thereof. Preferably, the aliphatic polyol is polyethylene glycol (PEG), polypropylene glycol (PPG), their copolymers, and mixtures thereof. More preferably, the polyol is polypropylene glycol (PPG). Suitable examples of the aliphatic dicarboxylic acid include adipic acid, glutaric acid, azelaic acid and mixtures thereof. The weight percentage of the oxirane groups is from 0.23% to 10%, preferably from 0.5% to 5%, and more preferably from 1% to 2.5% by dry weight, based on total dry weight of the (co)polymer.

The epoxy crosslinker has a viscosity less than 10000 mPa·s, preferably less than 3000 mPa·s, and more preferably less than 1000 mPa·s.

The epoxy crosslinker useful in the present invention and the preparation of such epoxy resins are disclosed, for example, in Lee, H. and Neville, K., Handbook of Epoxy Resins, McGraw-Hill Book Company, New York, 1967, Chapter 2, pages 2-1 to 2-27, incorporated herein by reference.

Other Components

The curable aqueous composition may further contain conventional treatment components such as emulsifiers, pigments, fillers or extenders, anti-migration aids, curing agents, coalescents, surfactants, biocides, plasticizers, organosilanes, anti-foaming agents, corrosion inhibitors, colorants, waxes, other polymers, and anti-oxidants.

Methods of Treating Substrates with the Curable Aqueous Composition

In another aspect of the present invention, a method for forming a treated substrate is provided comprising the steps of: a) forming the curable aqueous composition of the present invention; b) contacting a flexible substrate with the curable aqueous composition; and c) heating the curable aqueous composition at a temperature of from 80° C. to 250° C.

Suitable examples of the flexible substrate include paper, leather, woven or nonwoven fabrics, felts and mats or other assemblies of fibers, and fibers. Substrates including fibers may include cotton, synthetic fibers such as polyester and rayon, glass, and mixtures thereof.

The flexible substrate is contacted with the curable aqueous composition using conventional application techniques such as air or airless spraying, padding, saturating, roll coating, curtain coating, and printing.

The curable aqueous composition is heated at a temperature of from 80° C. to 200° C., preferably from 100° C. to 170° C., and more preferably from 125° C. to 150° C., for a time sufficient to achieve an acceptable level of cure such as for a time of from 1 minute to 10 minutes, preferably from 2 minutes to 5 minutes. The drying and curing functions can be conducted in two or more distinct steps. For example, the composition can be first heated at a temperature and for a time sufficient to substantially dry but not to substantially cure the composition and then heated for a second time at a higher temperature and/or for a longer period of time to effect curing. Such a procedure, referred to as "B-staging", can be used to provide binder-treated nonwoven, for example, in roll form, which can at a later stage be cured, with or without forming or molding into a particular configuration, concurrent with the curing process.

Treated Substrates

In yet another aspect of the present invention, a treated substrate formed by the method of the present invention is provided.

In the present specification, the technical features in each preferred technical solution and more preferred technical solution can be combined with each other to form new technical solutions unless indicated otherwise. For briefness, the Applicant omits the descriptions for these combinations. However, all the technical solutions obtained by combining these technical features should be deemed as being literally described in the present specification in an explicit manner.

EXAMPLES

I. Raw Material

Abbreviations used: PPG=polypropylene glycol; IPA=isopropanol; DI water=deionized water; EA=ethyl acrylate; EHA=2-ethylhexyl acrylate; BA=butyl acrylate; Sty=styrene; IA=itaconic acid; AA=acrylic acid; MAA=methacrylic acid; and NMA=n-methylol acrylamide.

D.E.R.™ 732 is an aliphatic epoxy resin having at least two reactive oxirane groups commercially available from The Dow Chemical Company. It has an epoxide equivalent weight (EEW) of 310-330 gr/eq and a viscosity of 60-70 mPa·s at 25° C.

D.E.R.™ 736 is an aliphatic epoxy resin having at least two reactive oxirane groups commercially available from The Dow Chemical Company. It has an epoxide equivalent weight (EEW) of 175-205 gr/eq and a viscosity of 30-60 mPa·s at 25° C.

D.E.R.™ 331 is a liquid epoxy resin reacted from epichlorohydrin and bisphenol A, commercially available from The Dow Chemical Company. It has an epoxide equivalent weight (EEW) of 182-192 gr/eq and a viscosity of 11000-14000 mPa·s at 25° C.

TRITON™ X-100 is a surfactant of The Dow Chemical Company.

II. Test Methods

1. Film Preparation and Young's Modulus Test

Each curable aqueous composition (4 g by dry weight) was put into a culture dish with inner diameter of 93 mm, and diluted with 13.33 g DI water under proper agitation. The dish was laid on a leveling surface for 4 days at room temperature without vibration. Then the dried film was removed from the dish. All the films were around 0.5 to 0.6 mm thick. The film was cured at 150° C. for 3 mins before testing. The cured film was cut into 22 mm×5 mm and its Young's modulus was tested by Instron 5943 tensile tester.

2. Treated Nonwoven Substrate and Tensile Strength Test

A piece of WHATMAN™ grade 4 filter paper (28 cm×46 cm, Whatman Ltd.) was dipped into 200 mL curable aqueous composition. The treated substrate was padded by Mathis padder and then dried and cured at designed conditions (120° C. for 3 minutes or 150° C. for 3 minutes). The add-on of the curable composition on paper was controlled between 28% and 32%. The cured substrate was cut into pieces of 1 inch×5 inch wherein the 5 inch direction is the cross-machine direction of the paper. The tensile strength of specimens was tested by Instron 5943 tensile tester under the treatment of dry (untreated), wet (after 30 minutes immersion in 0.1% TRITON™ X-100 solution) and "IPA" (after 30 minutes immersion in isopropanol). The wet strength reflects the resistance of curable aqueous composition in water and the IPA strength reflects the resistance of curable aqueous composition in solvent. The higher the strength, the better performance of the curable aqueous composition.

III. Experimental Examples

1. Preparation for Polymer Emulsions 710 g DI water and 65.6 g sodium lauryl sulfate were added to a 3 liter glass reactor under nitrogen, held for 30 minutes at ambient temperature and then heated to 57° C. 66 g Monomer Emulsion 1 (ME1) prepared by adding 585 g DI water, 2.85 g sodium carbonate, 4.1 g sodium dodecyl benzene sulfonate, 729 g BA, 126 g Sty, 31.5 g AA and 15 g IA in tank with proper stirring and 15 g of DI water were then added into the reactor. After two minutes, solutions of 5 g 0.15% aqueous iron sulfate heptahydrate, 3.33 g ammonium persulfate in 20 g DI water, and 0.17 g sodium bisulfate in 20 g DI water were added at a temperature of 56° C. An exotherm to 61.5° C. was observed over the next two minutes and the concurrent addition of the balance of ME1 and a solution of 0.88 g sodium bisfulfite in 60 g DI water begun. The addition proceeded over a period of 126 minutes with the temperature kept at 56.5° C. to 61.5° C. 30 g DI water was then added. Where appropriate, especially in a two stage polymerization, Monomer Emulsion 2 (ME2) prepared by adding 65 g DI water, 1.0 g sodium dodecyl benzene sulfonate, 2.5 g AA, 101 g Sty in tank with proper stirring, was then added into the reactor and solutions of 0.69 g 70% t-butyl hydroperoxide solution in 5 g DI water and 0.46 g isoascorbic acid in 5 g DI water were further added. After a period of 55 minutes during which the temperature was falling from 58° C. to 49° C., solutions of 1.0 g t-butyl hydroperoxide in 10 g DI water and 0.7 g isoascorbic acid in 10 g DI water were added. Fifteen minutes later, when the temperature was lowered to 47° C., solutions of 1.0 g t-butyl hydroperoxide in 10 g DI water and 0.7 g isoascorbic acid in 10 g DI water were added.

Polymer Emulsion 1 (PE1) was prepared according to the above process by a two-stage polymerization.

Polymer Emulsion 2 (PE2) was prepared according to the above process by a one-stage polymerization, except its ME1 comprised 650 g DI water, 16.5 g sodium lauryl sulfate, 950 g EA and 50 g IA.

Polymer Emulsion 3 (PE3) was prepared according to the above process by a one-stage polymerization, except its ME1 comprised 650 g DI water, 16.5 g sodium lauryl sulfate, 750 g EA, 200 g EHA and 50 g IA.

Polymer Emulsion 4 (PE4) was prepared according to the above process by a one-stage polymerization, except its ME1 comprised 650 g DI water, 16.5 g sodium lauryl sulfate, 750 g EA, 200 g EHA, 45 g AA and 5 g IA.

Polymer Emulsion 5 (PE5) was prepared according to the above process by a one-stage polymerization, except its ME1 comprised 650 g DI water, 16.5 g sodium lauryl sulfate, 750 g EA, 200 g EHA and 50 g AA.

Polymer Emulsion 6 (PE6) was prepared according to the above process by a one-stage polymerization, except its ME1 comprised 650 g DI water, 16.5 g sodium lauryl sulfate, 963 g EA and 37 g NMA.

2. Preparation for Curable Aqueous Compositions and Comparative Curable Aqueous Compositions (Comp.)

Each Polymer Emulsion and a crosslinker were properly agitated for 30 mins to obtain a curable aqueous composition. Detailed technical information was further described in Table 1 and Table 2.

IV. Results

TABLE 1

| Curable aqueous compositions | Comparative Composition 1 | Comparative Composition 2 | Composition 1 | Composition 2 |
|---|---|---|---|---|
| Polymer Emulsion | PE1 | PE1 | PE1 | PE1 |
| IA concentration* | 1.5% | 1.5% | 1.5% | 1.5% |
| Epoxy Crosslinker* | — | 3% D.E.R.331 | 3% D.E.R.736 | 6% D.E.R.736 |
| Oxirane Groups* | — | 1.2% | 1.2% | 2.4% |
| Young's Modulus | 0.26 MPa | 0.60 MPa | 1.56 MPa | 2.15 MPa |

*by dry weight percentage based on total dry weight of the (co)polymer.

TABLE 2

| Curable Aqueous Compositions | Polymer Emulsion | Epoxy Crosslinker | IA* | Oxirane Groups# |
|---|---|---|---|---|
| Comp. 3 | PE6 | — | — | — |
| Comp. 4 | PE2 | — | 5% | — |
| Comp. 5 | PE5 | — | — | — |
| Comp. 6 | PE4 | — | 0.5% | — |
| Comp. 7 | PE5 | D.E.R.736 | — | 1.4% |
| Comp. 8 | PE3 | — | 5% | — |
| 3 | PE2 | D.E.R.732 | 5% | 1.4% |
| 4 | PE2 | D.E.R.736 | 5% | 2.3% |
| 5 | PE3 | D.E.R.736 | 5% | 1.4% |
| 6 | PE4 | D.E.R.736 | 0.5% | 1.4% |
| 7 | PE3 | D.E.R.736 | 5% | 0.23% |
| 8 | PE3 | D.E.R.736 | 5% | 5.1% |

*by dry weight percentage based on total monomers of the (co)polymer.
by dry weight percentage based on total dry weight of the (co)polymer.

TABLE 3

| Curable Aqueous Compositions | Tensile Strength (curing at 120° C. × 3 mins) | | | Tensile Strength (curing at 150° C. × 3 mins) | | |
|---|---|---|---|---|---|---|
| Threshold* | Dry (>6.5) | Wet (>2.0) | IPA (>2.5) | Dry (>7.0) | Wet (>3.5) | IPA (>3.0) |
| Comp. 3 | 7.0 | 2.2 | 2.8 | 7.5 | 3.9 | 4.0 |
| Comp. 4 | 8.3 | 2.2 | 1.7 | 8.9 | 4.2 | 2.8 |
| 3 | 7.8 | 2.6 | 3.0 | 8.3 | 4.4 | 4.3 |
| 4 | 8.4 | 2.9 | 3.5 | 8.0 | 4.5 | 4.7 |
| Comp. 5 | — | — | — | 7.9 | 1.5 | 1.2 |
| 5 | — | — | — | 8.2 | 4.9 | 4.1 |
| Comp. 6 | — | — | — | 8.5 | 3.2 | 1.7 |
| Comp. 7 | — | — | — | 7.6 | 2.6 | 2.6 |
| 6 | — | — | — | 7.8 | 3.8 | 3.1 |
| Comp. 8 | — | — | — | 8.6 | 4.6 | 2.8 |
| 7 | — | — | — | 8.2 | 4.7 | 3.5 |
| 8 | — | — | — | 7.6 | 4.8 | 4.4 |

*Thresholds mean acceptable performance values.

As shown in Table 1, Comparative Composition 1 was a Comparative Curable Aqueous Composition comprising no Epoxy Crosslinker, and Comparative Composition 2 was a Comparative Curable Aqueous Composition comprising an aromatic Epoxy Crosslinker, which did not have the aliphatic chain. Both of the Comparative Compositions showed poorer Young's Modulus compared to each of the inventive Curable Aqueous Compositions 1 and 2.

Observation to both inventive examples, Curable Aqueous Compositions 1 and 2 supported that with higher oxirane groups concentration, Curable Aqueous Composition 2 showed even improved Young's Modulus compared to Curable Aqueous Composition 1.

Table 2 and Table 3 were Tensile Strength results for Comparative Curable Aqueous Compositions (Comp.) 3 to 8 and Inventive Curable Aqueous Compositions 3 to 8.

Inventive Curable Aqueous Compositions 3 and 4 comprised proper amounts of polymerized IA and epoxy crosslinker (oxirane groups concentration), and have improved tensile strengths (curing temperatures being 120° C. or 150° C.) compared to those of Comparative Curable Aqueous Composition 3, which did not comprise polymerized IA nor the epoxy crosslinker (oxirane groups concentration), and to those of Comparative Curable Aqueous Composition 4, which did not comprise the epoxy crosslinker (oxirane groups concentration).

Inventive Curable Aqueous Composition 5 comprised proper amounts of polymerized IA and epoxy crosslinker (oxirane groups concentration), and has improved tensile strengths (curing temperatures being 150° C.) compared to those of Comparative Curable Aqueous Composition 5, which did not comprise polymerized IA nor the epoxy crosslinker (oxirane groups concentration).

Inventive Curable Aqueous Composition 6 comprised proper amounts of polymerized IA and epoxy crosslinker (oxirane groups concentration), and has improved tensile strengths (curing temperatures being 150° C.) compared to those of Comparative Curable Aqueous Compositions 6 and 7, which comprised a proper amount of only polymerized IA or the epoxy crosslinker (oxirane groups concentration).

Inventive Curable Aqueous Compositions 7 and 8 comprised proper amounts of polymerized IA and epoxy crosslinker (oxirane groups concentration), and have improved tensile strengths (curing temperatures being 150° C.) compared to those of Comparative Curable Aqueous Composition 8, which comprised only a proper amount of polymerized IA.

The invention claimed is:

1. A curable aqueous composition comprising a (co)polymer and an epoxy crosslinker, wherein the (co)polymer comprises, as (co)polymerized units, from 0.05% to 10% by dry weight, based on total monomers of the (co)polymer, ethylenically unsaturated acidic monomers having at least two carboxylic acid groups, wherein said (co)polymer further comprises less than 2% by dry weight, based on total monomers of the (co)polymer, a (co)polymerized multi-ethylenically unsaturated monomer, and the epoxy crosslinker is an aliphatic compound having at least two reactive oxirane groups, wherein the epoxy crosslinker is selected from glycidyl ether, which is the reaction product of epichlorohydrin and aliphatic polyols, and glycidyl ester, which is the reaction product of epichlorohydrin and aliphatic dicarboxylic acids.

2. The curable aqueous composition according to claim 1 wherein the ethylenically unsaturated acidic monomers having at least two carboxylic acid groups are selected from itaconic acid, fumaric acid, maleic acid, aconitic acid, their salts, and mixtures thereof.

3. The curable aqueous composition according to claim 1 wherein the ethylenically unsaturated acidic monomers have two carboxylic acid groups.

4. The curable aqueous composition according to claim 1 wherein the (co)polymer further comprises up to 99.95% by dry weight, based on total monomers of the (co)polymer, one or more other (co)polymerized ethylenically unsaturated monomers.

5. The curable aqueous composition according to claim 1 wherein the (co)polymer excludes monomers generating formaldehyde on polymerization or during subsequent processing.

6. The curable aqueous composition according to claim 1 wherein the (co)polymer excludes N-alkylol(meth)acrylamide.

7. The curable aqueous composition according to claim 1 wherein the oxirane groups are present in the epoxy crosslinker in the range of from 0.23% to 10% by dry weight, based on total dry weight of the (co)polymer.

8. The curable aqueous composition according to claim 1 wherein the aliphatic polyol is selected from monomeric polyols and polymeric polyols.

9. The curable aqueous composition according to claim 8 wherein the aliphatic polyol is selected from polyethylene glycol, polypropylene glycol, their copolymers, and mixtures thereof.

10. The curable aqueous composition according to claim 1 wherein the epoxy crosslinker has a viscosity less than 10000 mPa·s.

11. A method for forming a treated substrate comprising the steps of:
   i) forming a curable aqueous composition comprising a (co)polymer and an epoxy crosslinker, wherein said (co)polymer comprises, as (co)polymerized units, from 0.05% to 10% by dry weight, based on total monomers of the (co)polymer, ethylenically unsaturated acidic monomers having at least two carboxylic acid groups, wherein said (co)polymer further comprises less than 2% by dry weight, based on total monomers of the (co)polymer, a (co)polymerized multi-ethylenically unsaturated monomer, said epoxy crosslinker is an aliphatic compound having at least two reactive oxirane groups, wherein said epoxy crosslinker is selected from glycidyl ether, which is the reaction product of epichlorohydrin and aliphatic polyols, and glycidyl ester, which is the reaction product of epichlorohydrin and aliphatic dicarboxylic acids;
   ii) contacting a flexible substrate with the curable aqueous composition; and
   iii) heating the curable aqueous composition at a temperature of from 80° C. to 250° C.

12. The method according to claim 11 wherein the flexible substrate is a woven or nonwoven fabric.

13. A substrate formed by the method of claim 11.

* * * * *